US012531009B2

(12) United States Patent
Ha

(10) Patent No.: US 12,531,009 B2
(45) Date of Patent: Jan. 20, 2026

(54) DISPLAY APPARATUS AND METHOD FOR DRIVING THE SAME

(71) Applicant: LG Display Co., Ltd., Seoul (KR)

(72) Inventor: Jae Yeong Ha, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/417,372

(22) Filed: Jan. 19, 2024

(65) Prior Publication Data

US 2024/0249667 A1 Jul. 25, 2024

(30) Foreign Application Priority Data

Jan. 25, 2023 (KR) ........................ 10-2023-0009342

(51) Int. Cl.
*G09G 3/32* (2016.01)

(52) U.S. Cl.
CPC ....... *G09G 3/32* (2013.01); *G09G 2310/0267* (2013.01); *G09G 2330/021* (2013.01); *G09G 2360/14* (2013.01)

(58) Field of Classification Search
CPC ........................................................ G09G 3/32
USPC ........................................................... 345/55
See application file for complete search history.

(56) References Cited

U.S. PATENT DOCUMENTS

2020/0403117 A1* 12/2020 Fabien ................ H01L 25/0753
2020/0410921 A1* 12/2020 Kim ..................... G09G 3/3233
2022/0102583 A1* 3/2022 Baumheinrich ....... G02B 6/105
2023/0247868 A1* 8/2023 Yamanaka ........... H10K 59/126

FOREIGN PATENT DOCUMENTS

WO WO-2019234548 A1 * 12/2019 ............... G09G 3/32
WO WO-2022225253 A1 * 10/2022 ........... G09G 3/2014

* cited by examiner

*Primary Examiner* — Kwin Xie
(74) *Attorney, Agent, or Firm* — Morgan, Lewis & Bockius LLP

(57) ABSTRACT

Provided are a display device and a method of driving the same that prevent an operation of an NIR proximity sensor from affecting luminance change, and the display device includes a display panel including a plurality of pixels, and a gate driver including first to fourth scan drivers and a light emission control signal driver, wherein each of the pixels includes a driving transistor configured to control a driving current of a light-emitting element, and a compensation transistor configured to compensate for a threshold voltage of the driving transistor, each of the pixels is sequentially driven in a first bias section, an initialization section, a sampling section, a second bias section, and a light emission section during one frame, and a first scan signal is output so that the compensation transistor is turned on before the sampling section.

5 Claims, 13 Drawing Sheets

DISPLAY APPARATUS AND METHOD FOR DRIVING THE SAME

This application claims the benefit of Korean Patent Application No. 10-2023-0009342, filed on Jan. 25, 2023, which is hereby incorporated by reference as if fully set forth herein.

BACKGROUND

Technical Field

The present disclosure relates to a display device and a method of driving the same.

Discussion of the Related Art

An electronic device such as a smartphone, a tablet computer, a digital camera, a laptop computer, a navigation system, or a smart television that provides an image to a user includes a display device for displaying the image.

In addition, an electronic device such as a smartphone or a tablet computer includes a proximity sensor configured to detect proximity of an object in order to execute various applications. As the proximity sensor, an NIR (Near Infrared) proximity sensor has been used.

The display device includes a panel configured to display an image through pixels arranged in a matrix with a plurality of gate lines and a plurality of data lines intersecting each other, and a driving circuit configured to drive the panel. Each pixel is independently driven by a thin film transistor (TFT).

However, when the NIR proximity sensor operates, light from an NIR light source is radiated to transistors of each pixel, resulting in leakage current of the transistors. As a result, luminance deviation of the display device may occur between when the NIR proximity sensor operates and when the NIR proximity sensor does not operate.

SUMMARY

Accordingly, the present disclosure is directed to a display device and a method of driving the same that substantially obviate one or more problems due to limitations and disadvantages of the related art.

This embodiment is intended to solve the above-described problem and provides a display device and a method of driving the same that prevent an operation of an NIR proximity sensor from affecting luminance change.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel provided with a plurality of pixels, and a gate driver including first to fourth scan drivers and a light emission control signal driver, wherein each of the pixels includes a driving transistor configured to control a driving current of a light-emitting element, and a compensation transistor configured to compensate for a threshold voltage of the driving transistor, each of the pixels is sequentially driven in a first bias section, an initialization section, a sampling section, a second bias section, and a light emission section during one frame, and the first scan driver outputs a first scan signal so that the compensation transistor is turned on before the sampling section.

In another aspect of the present disclosure, a display device includes a display panel provided with a plurality of pixels, and an NIR proximity sensor configured to detect proximity of an object, wherein each of the pixels includes a driving transistor configured to control a driving current of a light-emitting element and a bias transistor configured to apply a bias voltage to the driving transistor to relax hysteresis of the driving transistor, and the bias voltage supplied to the bias transistor is supplied as different voltages during a period when the NIR proximity sensor operates and during a period when the NIR proximity sensor does not operate.

It is to be understood that both the foregoing general description and the following detailed description of the present disclosure are by way of example and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
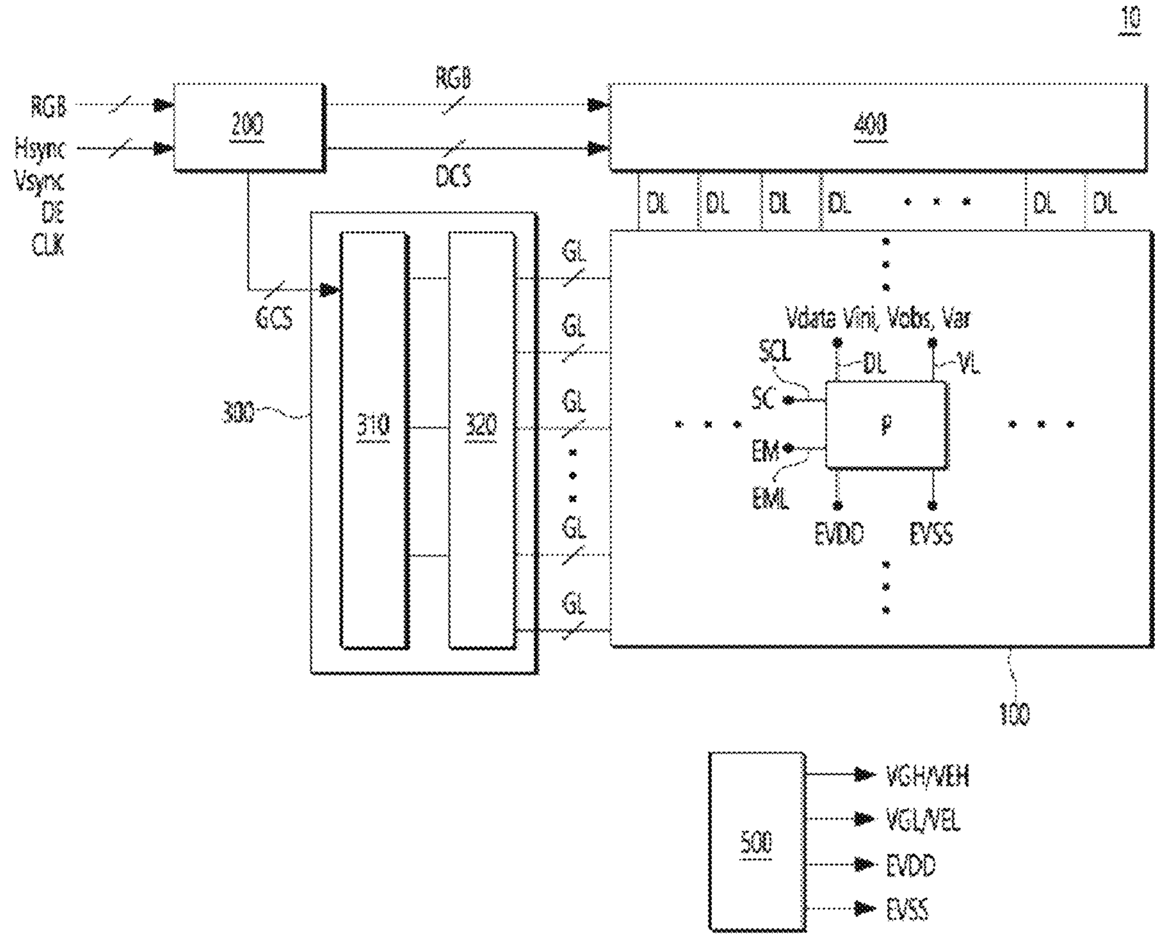
FIG. 1 is a block diagram illustrating a display device according to an embodiment of the present disclosure.

The advantages and features of the embodiments of the present disclosure, and the method for achieving the advantages and features will become apparent with reference to various embodiments described below in detail in conjunction with the accompanying drawings. However, the present disclosure is not limited to the various embodiments disclosed below and may be implemented in a variety of different forms, and the various embodiments of the present disclosure allow the disclosure of the present specification to be complete and are provided to fully inform those of ordinary skill in the art to which the present disclosure pertains of the scope of the invention. Further, the present disclosure is merely defined by the scope of the claims.

The shapes, sizes, proportions, angles, numbers, etc. disclosed in the drawings for describing various embodiments of the present disclosure are illustrative, and thus the present disclosure is not limited to the illustrated elements. The same reference symbols refer to the same elements throughout the specification. In addition, in describing the present disclosure, when it is determined that a detailed description of a related known technology may unnecessarily obscure the subject matter of the present disclosure, such a detailed description may be omitted. Where terms like "including," "having," "consisting," etc. are used in this specification, other parts may also be present, unless a term like "only" is used. Where an element is expressed in the singular, the element may be interpreted as being plural unless explicitly stated otherwise.

In interpreting elements included in various embodiments of the present disclosure, it is to be interpreted as including an error range even when there is no separate explicit description thereof.

In a description of various embodiments of the present disclosure, in the case of a description of a positional relationship, for example, where a positional relationship between two parts is described using terms like "on," "above," "below," "next to," etc., one or more other parts may be located between the two parts, unless a term like "immediately" or "directly" is used.

In a description of various embodiments of the present disclosure, in the case of a description of a temporal relationship, for example, where a temporal relationship is described using terms like "after," "subsequent to," "next," "before," etc., non-consecutive cases may be included unless a term like "immediately" or "directly" is used.

In a description of various embodiments of the present disclosure, even though terms like "first," "second," etc. may be used to describe various elements, these terms are merely used to distinguish between the same or similar elements. Therefore, an element modified by "first ~" in the present disclosure may be the same as an element modified by "second ~" within the technical idea of the present disclosure, unless specified otherwise.

Respective features of various embodiments of the present disclosure may be partially or wholly united or combined with each other, various types of interlocking and driving are technically possible, and various respective embodiments may be implemented independently of each other or may be implemented together in an interrelated relationship.

Hereinafter, a touch sensing device according to an embodiment of the present disclosure will be described in more detail with reference to the attached drawings.

FIG. 1 is a block diagram schematically illustrating a display device according to an embodiment of the present disclosure.

As illustrated in FIG. 1, the display device 10 includes a display panel 100 including a plurality of pixels P, a controller 200, a gate driver 300 configured to supply a gate signal to each of the plurality of pixels P, a data driver 400 configured to supply a data signal (or data voltage) to each of the plurality of pixels P, and a power supply 500 configured to supply power required for driving to each of the plurality of pixels P.

The display panel 100 includes a display area AA where the pixels P are located and a non-display area NA which is disposed to surround the display area AA and in which the gate driver 300 and the data driver 400 are disposed.

In the display panel 100, a plurality of gate lines GL and a plurality of data lines DL intersect each other, and each of the plurality of pixels P is connected to the gate line GL and the data line DL. Specifically, one pixel P receives a gate signal from the gate driver 300 through the gate line GL, receives a data signal from the data driver 400 through the data line DL, and receives a high-potential driving voltage EVDD and a low-potential driving voltage EVSS from the power supply 500.

The gate line GL supplies a scan signal SC and a light emission control signal EM to each of the plurality of pixels P, and the data line DL supplies a data voltage Vdata to each of the plurality of pixels P. According to various embodiments, the gate line GL may include a plurality of scan lines SCL each for supplying the scan signal SC and a plurality of light emission control signal lines EML each for supplying the light emission control signal EM. The plurality of pixels P may each receive a bias voltage Vobs and initialization voltages Var and Vini from a power line VL.

Each pixel P includes a light-emitting element EL and a pixel circuit configured to control driving of the light-emitting element EL. The light-emitting element EL may include an anode, a cathode, and a light-emitting layer between the anode and the cathode.

The pixel circuit may include a plurality of switching elements, a driving element, and a capacitor. The switching elements and the driving element may each be configured as a TFT. The driving element controls the amount of current supplied to the light-emitting element EL according to the data voltage Vdata to adjust the amount of light emitted by the light-emitting element EL. The plurality of switching elements is switched according to the scan signal SC supplied through each of the plurality of scan lines SCL and the light emission control signal EM supplied through each of the light emission control lines EML.

The display panel 100 may be implemented as a non-transmissive display panel or a transmissive display panel. The transmissive display panel may be applied to a transparent display device where an image is displayed on a screen and an actual object in a background is visible. The display panel 100 may be implemented as a flexible display panel. The flexible display panel may be implemented as an OLED panel using a plastic substrate.

Each pixel P may be divided into a red pixel, a green pixel, and a blue pixel to implement color. Each pixel P may further include a white pixel. Each pixel P includes a pixel circuit.

Touch sensors may be disposed on the display panel 100. Touch input may be sensed using separate touch sensors or may be sensed through pixels P. The touch sensors may be disposed on the screen of the display panel as an on-cell type or an add-on type, or may be implemented as in-cell type touch sensors incorporated in the display panel 100.

The controller 200 processes image data RGB input from the outside according to the size and resolution of the display panel 100 and supplies the image data RGB to the data driver 400. The controller 200 uses synchronization signals input from the outside, for example, a dot clock signal CLK, a data enable signal DE, a horizontal synchronization signal Hsync, and a vertical synchronization signal Vsync to generate a gate control signal GCS and a data control signal DCS. The controller 200 supplies the gate control signal GCS to the gate driver 300 to control operation timing of the gate driver 300. The controller 200 supplies the data control signal DCS to the data driver 400 to control operation timing of the data driver 400. The controller 200 synchronizes operation timing of the gate driver 300 and the data driver 400 using the gate control signal GCS and the data control signal DCS.

The controller 200 may be configured by being combined with various processors, for example, a microprocessor, a mobile processor, an application processor, etc., depending on the mounted device.

A host system may be any one of a television (TV) system, a set-top box, a navigation system, a personal computer (PC), a home theater system, a mobile device, a wearable device, or a vehicle system.

The controller 200 may control operation timing of a display panel driver at a frame frequency of input frame frequency×i (i being a positive integer greater than 0) by multiplying an input frame frequency by i. The input frame frequency is 60 Hz in the NTSC (National Television Standards Committee) method and 50 Hz in the PAL (Phase-Alternating Line) method, and may include operating frequencies of 120 Hz and 144 Hz in a mobile device.

The controller 200 may drive the pixel P at various refresh rates. The controller 200 may drive the pixel P in a variable refresh rate (VRR) mode, that is, in a switchable form between a first refresh rate and a second refresh rate. For example, the controller 200 may drive the pixel P at various refresh rates by simply changing a speed of a clock signal, generating a synchronization signal to create a horizontal blank or vertical blank, or driving the gate driver 300 using a mask method.

A voltage level of the gate control signal GCS output from the controller 200 may be converted into gate-on voltages VGL and VEL and gate-off voltages VGH and VEH through a level shifter (not shown) and supplied to the gate driver 300. The level shifter converts a low-level voltage of the gate control signal GCS into a gate low voltage VGL, and converts a high-level voltage of the gate control signal GCS into a gate high voltage VGH. The gate control signal GCS includes a start pulse and a shift clock.

The gate driver 300 supplies a gate signal to the gate line GL according to the gate control signal GCS supplied from the controller 200. The gate driver 300 may be disposed on one or both sides of the display panel 100 using a gate-in-panel (GIP) method.

The gate driver 300 sequentially outputs gate signals to the plurality of gate lines GL under the control of the controller 200. The gate driver 300 may sequentially supply the signals to the gate lines GL by shifting the gate signals using a shift register.

The gate signal may include the scan signal SC and the light emission control signal EM in an organic light-emitting display device. The scan signal SC includes a scan pulse that swings between the gate-on voltage VGL and the gate-off voltage VGH. The light emission control signal EM may include a light emission control signal pulse that swings between the gate-on voltage VEL and the gate-off voltage VEH. The scan pulse selects pixels P of a line on which the data voltage Vdata is to be written. The light emission control signal EM defines light emission times of the pixels P.

The gate driver 300 may include a light emission control signal driver 310 and at least one scan driver 320.

The light emission control signal driver 310 outputs a light emission control signal pulse in response to the start pulse and the shift clock from the controller 200, and sequentially shifts the light emission control signal pulses according to the shift clock.

The at least one scan driver 320 outputs a scan pulse in response to the start pulse and the shift clock from the controller 200 and shifts the scan pulse in accordance with shift clock timing.

The data driver 400 converts the image data RGB into the data voltage Vdata according to the data control signal DCS supplied from the controller 200 and supplies the data voltage Vdata to the pixel P through the data line DL.

FIG. 1 illustrates that one data driver 400 is disposed on one side of the display panel 100. However, the number and arrangement positions of data drivers 400 are not limited thereto. That is, the data driver 400 may include a plurality of integrated circuits (IC) and may be arranged separately on one side of the display panel 100.

The power supply 500 uses a DC-DC converter to generate direct current (DC) power necessary to drive the pixel array of the display panel 100 and the display panel driver. The DC-DC converter may include a charge pump, a regulator, a buck converter, a boost converter, etc. The power supply 500 may receive input of a direct current input voltage from the host system (not shown) and generate DC voltages such as the gate-on voltages VGL and VEL, the gate-off voltages VGH and VEH, the high-potential driving voltage EVDD, and the low-potential driving voltage EVSS. The gate-on voltages VGL and VEL and the gate-off voltages VGH and VEH are supplied to the level shifter (not shown) and the gate driver 300. The high-potential driving voltage EVDD and the low-potential driving voltage EVSS are commonly supplied to the pixels P.

Figure 2:
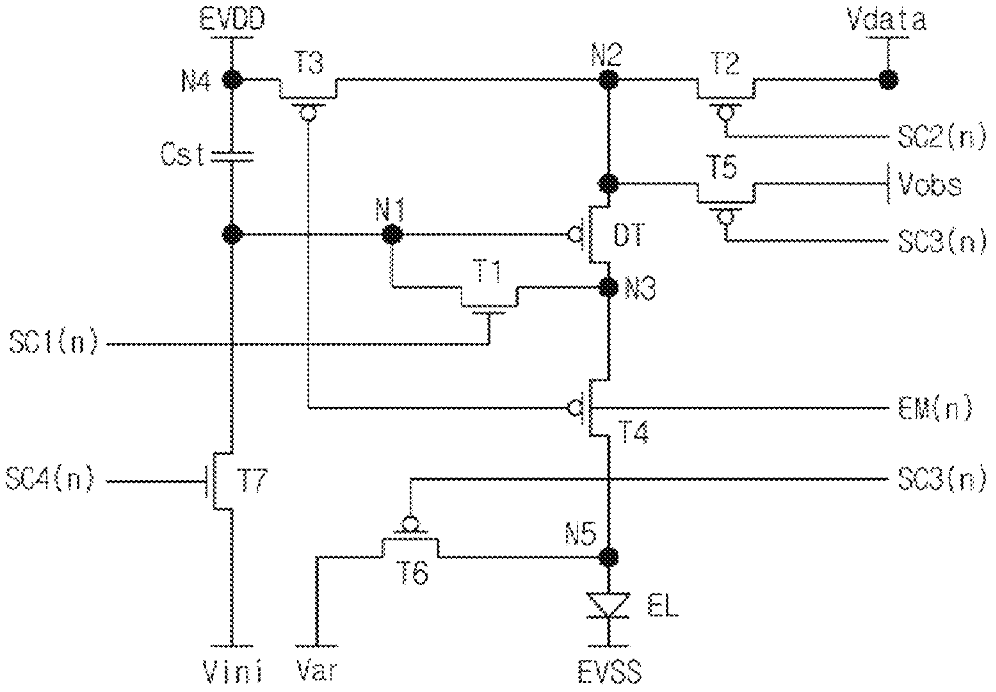
FIG. 2 is a diagram illustrating a pixel circuit in the display device according to an embodiment of the present disclosure.

FIG. 2 is an equivalent circuit diagram of one subpixel in the display device according to an embodiment of the present disclosure.

FIG. 2 merely illustrates one subpixel circuit. Hereinafter, for convenience, a display device having a pixel circuit structure of FIG. 2 will be described. FIG. 2 illustrates a subpixel of an MTO pixel structure using an oxide semiconductor TFT and a polycrystalline silicon TFT to improve power consumption and enable low-speed operation.

As shown in FIG. 2, each of the plurality of subpixels P may include a pixel circuit having a driving transistor DT, and a light-emitting element EL driven by the pixel circuit.

The pixel circuit may drive the light-emitting element EL by controlling a driving current flowing through the light-emitting element EL. The pixel circuit may include a driving transistor DT, first to seventh switching transistors T1 to T7, and a capacitor Cst. Each of the transistors DT and T1 to T7 may include a first electrode, a second electrode, and a gate electrode. One of the first electrode and the second electrode may be a source electrode, and the other of the first electrode and the second electrode may be a drain electrode.

Figure 4:
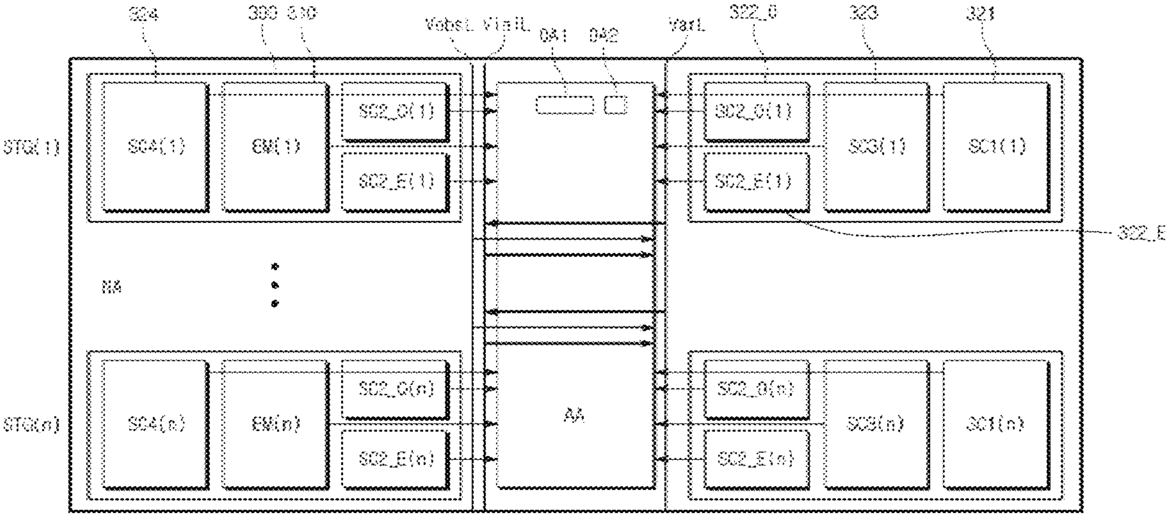
FIG. 4 is a block diagram illustrating a configuration of a gate driver in the display device according to an embodiment of the present disclosure.

Each of the transistors DT and T1 to T7 may be a P-type TFT or N-type TFT. In the embodiment of FIG. 4, the first switching transistor T1 and the seventh switching transistor T7 are N-type TFTs, and the other transistors DT and T2 to T6 are P-type TFTs. However, the present disclosure is not limited thereto, and depending on the embodiment, all or some of the transistors DT and T1 to T7 may be P-type TFTs or N-type TFTs. In addition, the N-type TFT may be an oxide TFT, and the P-type TFT may be a polycrystalline silicon TFT.

Hereinafter, a description will be given on the assumption that the first switching transistor T1 and the seventh switching transistor T7 are N-type TFTs, and the other transistors DT and T2 to T6 are P-type TFTs. Accordingly, the first switching transistor T1 and the seventh switching transistor T7 are each turned on in response to a high voltage, and the other transistors DT and T2 to T6 are each turned on in response to a low voltage.

According to an example, the first switching transistor T1 included in the pixel circuit may function as a compensation transistor, the second switching transistor T2 may function as a data supply transistor, the third and fourth switching transistors T3 and T4 may function as light emission control transistors, the fifth switching transistor T5 may function as a bias transistor, and the sixth and seventh switching transistors T6 and T7 may function as initialization transistors.

The light-emitting element EL may include an anode and a cathode. The anode of the light-emitting element EL may be connected to a fifth node N5, and the cathode may be connected to the low-potential driving voltage EVSS.

The driving transistor DT may include a first electrode connected to a second node N2, a second electrode connected to a third node N3, and a gate electrode connected to a first node N1. The driving transistor DT may provide a driving current corresponding to a voltage of the first node N1 (or the data voltage Vdata stored in the capacitor Cst, which will be described later) to the light-emitting element EL.

The first switching transistor T1 may include a first electrode connected to the first node N1, a second electrode connected to the third node N3, and a gate electrode configured to receive a first scan signal SC1(*n*). The first transistor T1 is turned on in response to the first scan signal SC1(*n*), and may connect the first node N1 and the third node N3 to operate the driving transistor DT as a diode, thereby sampling a threshold voltage Vth of the driving transistor DT. The first switching transistor T1 may be a compensation transistor.

The capacitor Cst may be connected between the first node N1 and a fourth node N4. The capacitor Cst may store or maintain the high-potential driving voltage EVDD.

The second switching transistor T2 may include a first electrode connected to the data line DL (or receiving the data voltage Vdata), a second electrode connected to the second node N2, and a gate electrode configured to receive a second scan signal (SC2(*n*)). The second switching transistor T2 is turned on in response to the second scan signal SC2(*n*) and may transmit the data voltage Vdata to the second node N2. The second switching transistor T2 may be a data supply transistor.

The third switching transistor T3 and the fourth switching transistor T4 (or first and second light emission control transistors) are connected between the high-potential driving voltage EVDD and the light-emitting element EL, and it is possible to form a current movement path through which a driving current generated by the driving transistor DT moves.

The third switching transistor T3 may include a first electrode connected to the fourth node N4 to receive the high-potential driving voltage EVDD, a second electrode connected to the second node N2, and a gate electrode configured to receive a light emission control signal EM(n).

The fourth switching transistor T4 may include a first electrode connected to the third node N3, a second electrode connected to the fifth node N5 (or the anode of the light-emitting element EL), and a gate electrode configured to receive the light emission control signal EM(n).

The third and fourth switching transistors T3 and T4 are turned on in response to the light emission control signal EM(n). In this case, a driving current is provided to the light-emitting element EL, and the light-emitting element EL may emit light with a luminance corresponding to the driving current.

The fifth switching transistor T5 may include a first electrode configured to receive a bias voltage Vobs, a second electrode connected to the second node N2, and a gate electrode configured to receive a third scan signal SC3(*n*). The fifth switching transistor T5 may be a bias transistor.

The sixth switching transistor T6 may include a first electrode configured to receive a first initialization voltage Var, a second electrode connected to the fifth node N5, and a gate electrode configured to receive the third scan signal SC3(*n*).

The sixth switching transistor T6 is turned on in response to the third scan signal SC3(*n*) before the light-emitting element EL emits light (or after the light-emitting element EL emits light), and may initialize the anode of the light-emitting element EL using the first initialization voltage Var. The light-emitting element EL may have a parasitic capacitor formed between the anode and the cathode. While the light-emitting element EL emits light, the parasitic capacitor is charged so that the anode of the light-emitting element EL may have a specific voltage. Accordingly, the amount of charge accumulated in the light-emitting element EL may be initialized by applying the first initialization voltage Var to the anode of the light-emitting element EL through the sixth switching transistor T6.

In the present disclosure, the gate electrodes of the fifth and sixth switching transistors T5 and T6 are configured to commonly receive the third scan signal SC3(*n*). However, the present disclosure is not necessarily limited thereto, and the gate electrodes of the fifth and sixth switching transistors T5 and T6 may be configured to be independently controlled according to separate scan signals.

The seventh switching transistor T7 may include a first electrode configured to receive a second initialization voltage Vini, a second electrode connected to the first node N1, and a gate electrode configured to receive a fourth scan signal SC4(*n*).

The seventh switching transistor T7 is turned on in response to the fourth scan signal SC4(*n*) and may initialize the gate electrode of the driving transistor DT using the second initialization voltage Vini. Unnecessary charges may remain on the gate electrode of the driving transistor DT due to the high-potential driving voltage EVDD stored in the capacitor Cst. Accordingly, the remaining charges may be initialized by applying the second initialization voltage Vini to the gate electrode of the driving transistor DT through the seventh switching transistor T7.

Figure 3A:
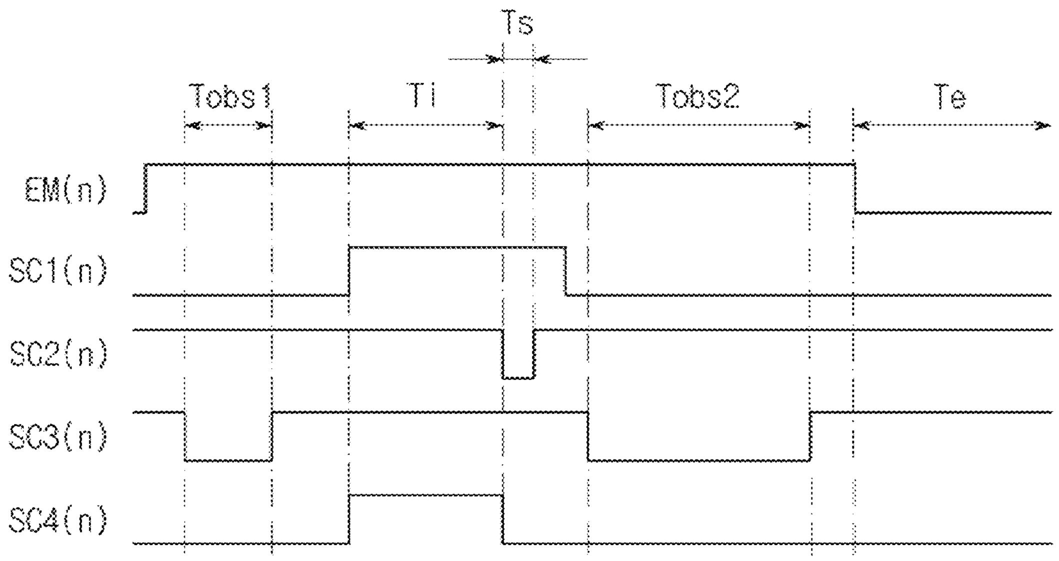
FIGS. 3A and 3B are diagrams illustrating driving waveforms corresponding to a refresh period and a hold period for an operation of the pixel circuit of FIG. 2.
Figure 3B:
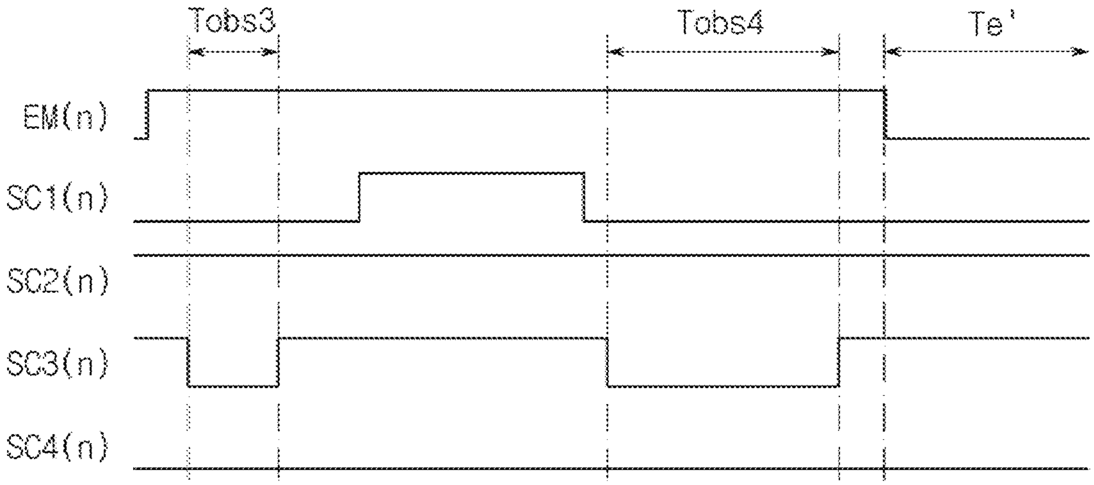

FIGS. 3A and 3B are diagrams for describing a process in which the pixel circuit illustrated in FIG. 2 operates according to a scan signal and a light emission control signal in a refresh period and a hold period.

A display device according to an embodiment of the present disclosure may be a display device having a VRR mode. In the VRR mode, driving is performed at a reference frame frequency, the pixel may be operated at a refresh rate, at which the data voltage Vdata is updated, higher than the reference frame frequency when high-speed driving is required, or the pixel may be operated at a refresh rate lower than the reference frame frequency when power consumption is decreased or low-speed driving is required.

Each of the plurality of pixels P may be driven by a combination of a refresh frame and a hold frame within 1 second. In the present disclosure, one frame may be defined as a cycle in which a combination of a refresh period in which the data voltage Vdata is updated for 1 second and a hold period in which the data voltage Vdata is not updated is repeated.

When driving is performed at a refresh rate of 120 Hz, driving may be performed only in a refresh period. That is, driving may be performed in 120 refresh periods within 1 second. One refresh period is 1/120=8.33 ms, and one frame period is 8.33 ms.

When driving is performed at a refresh rate of 60 Hz, driving may be performed alternately in a refresh period and a hold period. That is, driving may be performed alternately in the refresh period 60 times and the hold period 60 times within 1 second. The duration of one refresh period and one hold period each is 0.5/60=8.33 ms, and one frame period is 16.66 ms.

When driving is performed at a refresh rate of 1 Hz, driving may be performed in one frame having one refresh period and 119 hold periods after the one refresh period. The duration of each of one refresh period and one hold period is 1/120=8.33 ms, and one frame period is 1 s.

In the refresh period, charging with a new data voltage Vdata is performed and the new data voltage Vdata is applied to the driving transistor DT, while in the hold period, a data voltage Vdata of a previous frame is maintained without change. Meanwhile, the hold period may be referred to as a skip period in the sense that a process of applying a new data voltage Vdata to the driving transistor DT is omitted.

Each of the plurality of pixels P may be charged or initialize the remaining voltage within the pixel circuit during the refresh period. Specifically, each of the plurality of pixels P may remove an influence of the data voltage Vdata and the high-potential driving voltage EVDD stored in the previous frame in the refresh period. Accordingly, each of the plurality of pixels P may display an image corresponding to the new data voltage Vdata in the hold period.

Each of the plurality of pixels P may display an image by providing a driving current corresponding to the data voltage Vdata to the light-emitting element EL during the hold period, and maintain a turn-on state of the light-emitting element EL.

First, operations of the pixel circuit and the light-emitting element during the refresh period of FIG. 3A will be described. The refresh period may include at least one bias section Tobs1 or Tobs2, an initialization section Ti, a sampling section Ts, and a light emission section Te for driving. However, this is only an example, and the present disclosure is not necessarily bound to this order.

As illustrated in FIG. 3A, the pixel circuit may operate including the at least one bias section Tobs1 or Tobs2 during the refresh period.

The at least one bias section Tobs1 or Tobs2 is a section in which an on-bias stress (OBS) operation of applying a bias voltage Vobs is performed, the light emission control signal EM(n) is a high voltage, and the third and fourth switching transistors T3 and T4 are turned off. The first scan signal SC1(*n*) and the fourth scan signal SC4(*n*) are low voltages, and the first switching transistor T1 and the seventh switching transistor T7 are turned off. The second scan signal SC2 is a high voltage and the second switching transistor T2 is turned off.

The third scan signal SC3(*n*) is input as a low voltage, and the fifth and sixth switching transistors T5 and T6 are turned on. As the fifth switching transistor T5 is turned on, the bias voltage Vobs is applied to the first electrode of the driving transistor DT connected to the second node N2.

Here, when the bias voltage Vobs is supplied to the third node N3, which is the drain electrode of the driving transistor DT, a charging time or charging delay of a voltage of the fifth node N5, which is the anode of the light-emitting element EL, may be reduced in the light emission period. The driving transistor DT maintains a stronger saturation state.

For example, as the bias voltage Vobs increases, a voltage of the third node N3, which is the drain electrode of the driving transistor DT, may increase, and a gate-source voltage or a drain-source voltage of the driving transistor DT may decrease. Therefore, it is desirable that the bias voltage Vobs at least be greater than the data voltage Vdata.

In this instance, the magnitude of the drain-source current passing through the driving transistor DT may be reduced, and the stress of the driving transistor DT may be reduced in a positive bias stress situation, thereby solving the charging delay of the voltage of the third node N3. In other words, performing the OBS operation before sampling the threshold voltage Vth of the driving transistor DT may relax hysteresis of the driving transistor DT.

Accordingly, in the at least one bias section Tobs1 or Tobs2, the OBS operation may be defined as an operation of directly applying an appropriate bias voltage to the driving transistor DT during non-light emission periods.

In addition, in the at least one bias section Tobs1 or Tobs2, as the sixth switching transistor T6 is turned on, the anode (or pixel electrode) of the light-emitting element EL connected to the fifth node N5 is initialized to the first initialization voltage Var.

However, gate electrodes of the fifth and sixth switching transistors T5 and T6 may be configured to be independently controlled by receiving separate scan signals. That is, it is not necessarily required to simultaneously apply bias voltages to the first electrode of the driving transistor DT and the anode of the light-emitting element EL in the bias section.

As shown in FIG. 3A, the pixel circuit may operate including the initialization section Ti during the refresh period. The initialization section Ti is a section in which a voltage of the gate electrode of the driving transistor DT is initialized.

The first scan signal SC1(*n*) to the fourth scan signal SC4(*n*) and the light emission control signal EM(n) are high voltages, and the first switching transistor T1 and the seventh switching transistor T7 are turned on. Further, the second to sixth switching transistors T2, T3, T4, T5, and T6 are turned off. As the first and seventh switching transistors T1 and T7 are turned on, the gate electrode and the second electrode of the driving transistor DT connected to the first node N1 are initialized to the second initialization voltage Vini.

As illustrated in FIG. 3A, the pixel circuit may operate including the sampling section Ts during the refresh period. The sampling section is a section in which the threshold voltage Vth of the driving transistor DT is sampled.

High voltages are input as the first scan signal SC1(*n*), the third scan signal SC3(*n*), and the light emission control signal EM(n), and low voltages are input as the second scan signal SC2(*n*) and the fourth scan signal SC4(*n*). Accordingly, the third to seventh switching transistors T3, T4, T5, T6, and T7 are turned off, the first switching transistor T1 remains on, and the second switching transistor T2 is turned on. That is, the second switching transistor T2 is turned on, the data voltage Vdata is applied to the driving transistor DT, and the first switching transistor T1 is diode-connected between the first node N1 and the third node N3, so that the threshold voltage Vth of the driving transistor DT may be sampled.

As shown in FIG. 3A, the pixel circuit may operate including the light emission section Te during the refresh period. The light emission section Te is a section in which the sampled threshold voltage Vth is offset and the light-emitting element EL emits light with a driving current corresponding to the sampled data voltage.

The light emission control signal EM(n) is a low voltage, and the third and fourth switching transistors T3 and T4 are turned on.

As the third switching transistor T3 is turned on, the high-potential driving voltage EVDD connected to the fourth node N4 is applied to the first electrode of the driving transistor DT connected to the second node N2 through the third switching transistor T3. The driving current supplied from the driving transistor DT to the light-emitting element EL via the fourth switching transistor T4 is independent of a value of the threshold voltage of the driving transistor DT, and the threshold voltage of the driving transistor DT may be compensated.

Next, with reference to FIG. 3B, driving of the pixel circuit and the light-emitting element during the hold period will be described.

The hold period may include at least one bias section Tobs3 or Tobs4 and a light emission section Te'. Description of an operation of the pixel circuit, which is the same as the operation during the refresh period, will be omitted.

As described above, there is a difference in that charging with the new data voltage Vdata is performed and the new data voltage Vdata applied to the gate electrode of the driving transistor DT in the refresh period, while the data voltage Vdata of the refresh period is maintained without change in the hold period. Therefore, unlike the operation in the refresh period, the operation in the hold period does not require the initialization section Ti and the sampling section Ts.

In the operation in the hold period, one OBS operation may be sufficient. However, in this embodiment, for convenience of the driving circuit, the third scan signal SC3(*n*) in the hold period is the same as the third scan signal SC3(*n*) in the refresh period. As a result, the OBS operation may be performed twice as in the refresh period.

A difference between the driving signal in the refresh period described in FIG. 3A and the driving signal in the hold period in FIG. 3B lies in the second and fourth scan signals SC2(*n*) and SC4(*n*). In the hold period, since the initialization section Ti and the sampling section Ts are unnecessary, unlike the refresh period, the second scan signal SC2(*n*) is a high voltage at all times, and the fourth scan signal SC4(*n*) is a low voltage at all times. That is, the second and seventh switching transistors T2 and T7 are turned off at all times.

FIG. 4 is a diagram illustrating a configuration of the gate driver in the display device of the present disclosure according to the configuration of the subpixel of FIG. 2.

As illustrated in FIG. 4, the gate driver 300 includes the light emission control signal driver 310 and the scan driver 320. The scan driver 320 may include first to fourth scan drivers 321, 322, 323, and 324. In addition, the second scan driver 322 may include an odd-numbered second scan driver 322_O and an even-numbered second scan driver 322_E, respectively.

The gate driver 300 may include shift registers configured symmetrically on both sides of the display area AA. In addition, the gate driver 300 may be configured such that the shift register on one side of display area AA includes the second scan drivers 322_O and 322_E, the fourth scan driver 324, and the light emission control signal driver 310, respectively, and the shift register on the other side of display area AA includes the first scan driver 321, the second scan drivers 322_O and 322_E, and the third scan driver 323, respectively. However, the present disclosure is not limited thereto, and the light emission control signal driver 310 and the first to fourth scan drivers 321, 322, 323, and 324 may be arranged differently depending on the embodiment.

Each of stages STG1 to STGn of the shift register includes first scan signal generators SC1(1) to SC1(*n*), second scan signal generators SC2_O(1) to SC2_O(n) and SC2_E(1) to SC2_E(n), third scan signal generators SC3(1) to SC3(*n*), fourth scan signal generators SC4(1) to SC4(*n*), and light emission control signal generators EM(1) to EM(n).

The first scan signal generators SC1(1) to SC1(*n*) output the first scan signals SC1(1) to SC1(*n*) through first scan lines SCL1 of the display panel 100. The second scan signal generators SC2(1) to SC2(*n*) output the second scan signals SC2(1) to SC2(*n*) through second scan lines SCL2 of the display panel 100. The third scan signal generators SC3(1) to SC3(*n*) output the third scan signals SC3(1) to SC3(*n*) through third scan lines SCL3 of the display panel 100. The fourth scan signal generators SC4(1) to SC4(*n*) output the fourth scan signals SC4(1) to SC4(*n*) through fourth scan lines SCL4 of the display panel 100. The light emission control signal generators EM(1) to EM(n) output light emission control signals EM(1) to EM(n) through the light emission control lines EML of the display panel 100.

The first scan signals SC1(1) to SC1(*n*) may be used as signals to drive an Ath switching transistor (for example, a compensation transistor, etc.) included in the pixel circuit. The second scan signals SC2(1) to SC2(*n*) may be used as signals to drive a Bth switching transistor (for example, a data supply transistor, etc.) included in the pixel circuit. The third scan signals SC3(1) to SC3(*n*) may be used as signals to drive a Cth switching transistor (for example, a bias transistor, etc.) included in the pixel circuit. The fourth scan signals SC4(1) to SC4(*n*) may be used as signals to drive a Dth switching transistor (for example, an initialization transistor, etc.) included in the pixel circuit. The light emission control signals EM(1) to EM(n) may be used as signals to drive an Eth switching transistor (for example, a light emission control transistor, etc.) included in the pixel circuit. For example, when the light emission control transistors of the pixels are controlled using the light emission control signals EM(1) to EM(n), a light emission time of the light-emitting element may be varied.

As shown in FIG. 4, a bias voltage bus line VobsL, a first initialization voltage bus line VarL, and a second initialization voltage bus line ViniL may be disposed between the gate driver 300 and the display area AA.

The bias voltage bus line VobsL, the first initialization voltage bus line VarL, and the second initialization voltage bus line ViniL may receive the bias voltage Vobs, the first initialization voltage Var, and the second initialization voltage Vini from the power supply 500 and supply the bias voltage Vobs, the first initialization voltage Var, and the second initialization voltage Vini to the pixel circuit, respectively.

FIG. 4 illustrates that the bias voltage bus line VobsL, the first initialization voltage bus line VarL, and the second initialization voltage bus line ViniL are located only on one side among the left side or right side of the display area AA. However, the present disclosure is not limited thereto, and the lines may be located on both sides, and even when the lines are located on one side, the location on the left or right is not limited.

As illustrated in FIG. 4, one or more optical areas OA1 and OA2 may be disposed in the display area AA.

The one or more optical areas OA1 and OA2 may be arranged to overlap one or more optical electronic devices, such as a photographing device such as a camera (image sensor), and a detection sensor such as an NIR proximity sensor or an illuminance sensor.

The one or more optical areas OA1 and OA2 may have a transmittance of a certain level or more by forming a light transmission structure for an operation of an optical electronic device. In other words, the number of pixels P per unit area in the one or more optical areas OA1 and OA2 may be smaller than the number of pixels P per unit area in a general area excluding the optical areas OA1 and OA2 in the display area AA. That is, resolution of the one or more optical areas OA1 and OA2 may be lower than resolution of the general area in the display area AA.

The light transmission structure in the one or more optical areas OA1 and OA2 may be constructed by patterning a cathode in an area where the pixels P are not disposed. In this instance, the patterned cathode may be removed using a laser, or the cathode may be selectively formed and patterned by using a material such as a cathode deposition prevention layer.

In addition, in the one or more optical areas OA1 and OA2, the light transmission structure may be constructed by separately forming the light-emitting element EL and the pixel circuit in the pixel P. In other words, the light-emitting element EL of the pixel P is located on the optical areas OA1 and OA2, and a plurality of transistors TFTs included in the pixel circuit are arranged around the optical areas OA1 and OA2, so that the light-emitting element EL and the pixel circuit may be electrically connected through a transparent metal layer.

When the NIR proximity sensor disposed in the one or more optical areas OA1 and OA2 described in FIG. 4 operates and light from the NIR light source is radiated to the transistors of the subpixel configured as shown in FIG. 2, OFF current of the transistor increases, and the threshold voltage Vth of the transistor may be positively shifted.

In particular, in the subpixel configured as shown in FIG. 2, when light from the NIR light source is radiated to the fifth switching transistor T5, the off-state current of the transistor increases, and the threshold voltage Vth of the transistor is positively shifted, so that leakage current of the fifth switching transistor T5 may increase.

As such, when the leakage current increases in the fifth switching transistor T5, the bias voltage Vobs is supplied to the first electrode (second node N2) of the driving transistor DT, and thus a gate-source voltage Vgs of the driving transistor DT increases.

In this way, when the NIR proximity sensor operates and the gate-source voltage Vgs of the driving transistor DT increases, luminance increases.

As a result, luminance deviation occurs between when the NIR proximity sensor operates and when the NIR proximity sensor does not operate.

Therefore, technology is required to prevent the operation of the NIR proximity sensor from affecting luminance change.

Figure 5:
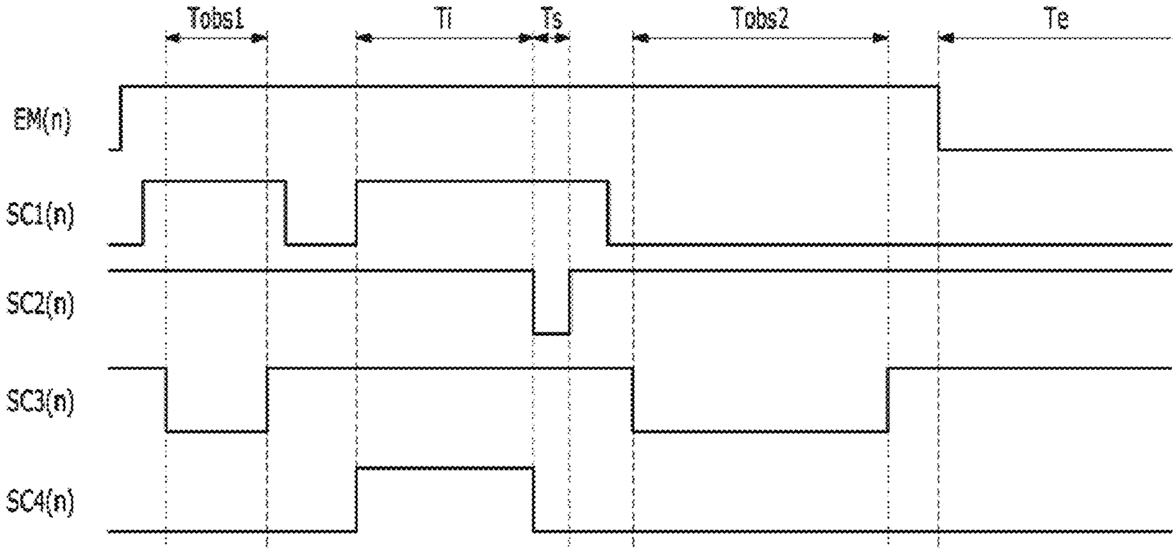
FIG. 5 is a diagram illustrating a driving waveform of the pixel circuit of FIG. 2 for preventing an operation of an NIR proximity sensor from affecting luminance change according to an embodiment of the present disclosure.

FIG. 5 is a diagram illustrating a driving waveform of the pixel circuit of FIG. 2 for preventing the operation of the NIR proximity sensor from affecting luminance change according to an embodiment of the present disclosure.

FIGS. 6A to 6E are diagrams for describing operations of the transistors of the subpixel in the first bias section Tobs1, the initialization section Ti, the sampling section Ts, the second bias section Tobs2, and the light emission section Te of FIG. 5.

In order to minimize the luminance change according to the operation of the NIR proximity sensor, a method of driving the display device according to an embodiment of the present disclosure drives the first scan signal SC1(*n*) at a high level in the first bias section Tobs1 described in FIG. 3A.

A detailed description thereof is as follows.

Figure 6A:
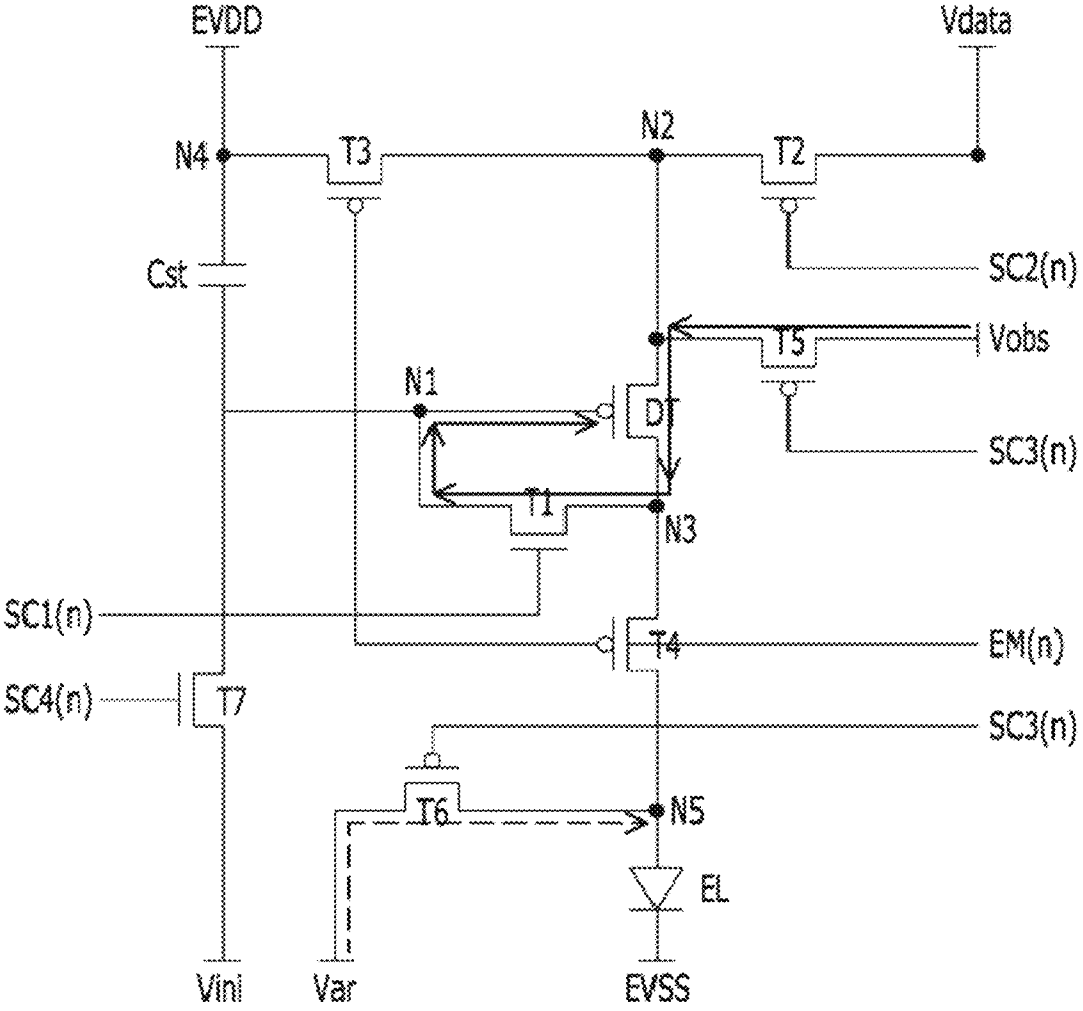
FIGS. 6A to 6E are diagrams for describing operations of transistors of a subpixel in a first bias section Tobs1, an initialization section Ti, a sampling section Ts, a second bias section Tobs2, and a light emission section Te of FIG. 5.

As illustrated in FIGS. 5 and 6A, the pixel circuit may operate in various sections including the first bias section Tobs1.

The first bias section Tobs1 is a section in which the OBS operation of applying the bias voltage Vobs is performed.

In the first bias section Tobs1, the light emission control signal EM(n) is input as a high-level voltage, and thus the third and fourth switching transistors T3 and T4 are turned off. Since the first scan signal SC1(*n*) is input as a high-level voltage, and the second scan signal SC4(*n*) is input as a low-level voltage, the first switching transistor T1 is turned on, and the second switching transistor T2 is turned off.

Since the third scan signal SC3(*n*) is input as a low-level voltage, the fifth and sixth switching transistors T5 and T6 are turned on. As the fifth switching transistor T5 is turned on, the bias voltage Vobs is applied to the first electrode of the driving transistor DT connected to the second node N2.

Here, when the bias voltage Vobs is supplied to the third node N3, which is the drain electrode of the driving transistor DT, a charging time or charging delay of a voltage of the fifth node N5, which is the anode of the light-emitting element EL, may be decreased in the light emission period. The driving transistor DT maintains a stronger saturation state.

For example, as the bias voltage Vobs increases, the voltage of the third node N3, which is the drain electrode of the driving transistor DT, may increase, and the gate-source voltage or drain-source voltage of the driving transistor DT may decrease. Therefore, it is desirable that the bias voltage Vobs at least be greater than the data voltage Vdata.

In this instance, the magnitude of the drain-source current passing through the driving transistor DT may be reduced, and stress of the driving transistor DT may be reduced in a positive bias stress situation, thereby solving the charging delay of the voltage of the third node N3. In other words, performing the OBS operation before sampling the threshold voltage Vth of the driving transistor DT may relax hysteresis of the driving transistor DT.

In the first bias section Tobs1, as the sixth switching transistor T6 is turned on by the third scan signal SC3(*n*), the anode (or pixel electrode) of the light-emitting element EL connected to the fifth node N5 is initialized to the first initialization voltage Var.

However, the gate electrodes of the fifth and sixth switching transistors T5 and T6 may be configured to be independently controlled by receiving separate scan signals. That is, it is not necessarily required to simultaneously apply bias voltages to the first electrode of the driving transistor DT and the anode of the light-emitting element EL in the bias section.

In addition, since the first scan signal SC1(*n*) is input as a high-level voltage, the first switching transistor T1 is turned on. When the first switching transistor T1 is turned on, a voltage difference between the gate electrode (first node N1) and the second electrode (third node N3) of the driving transistor disappears (potentials become equal).

Accordingly, due to leakage current of the fifth switching transistor T5, an increase in the gate-source voltage Vgs of the driving transistor DT is alleviated.

Figure 6B:
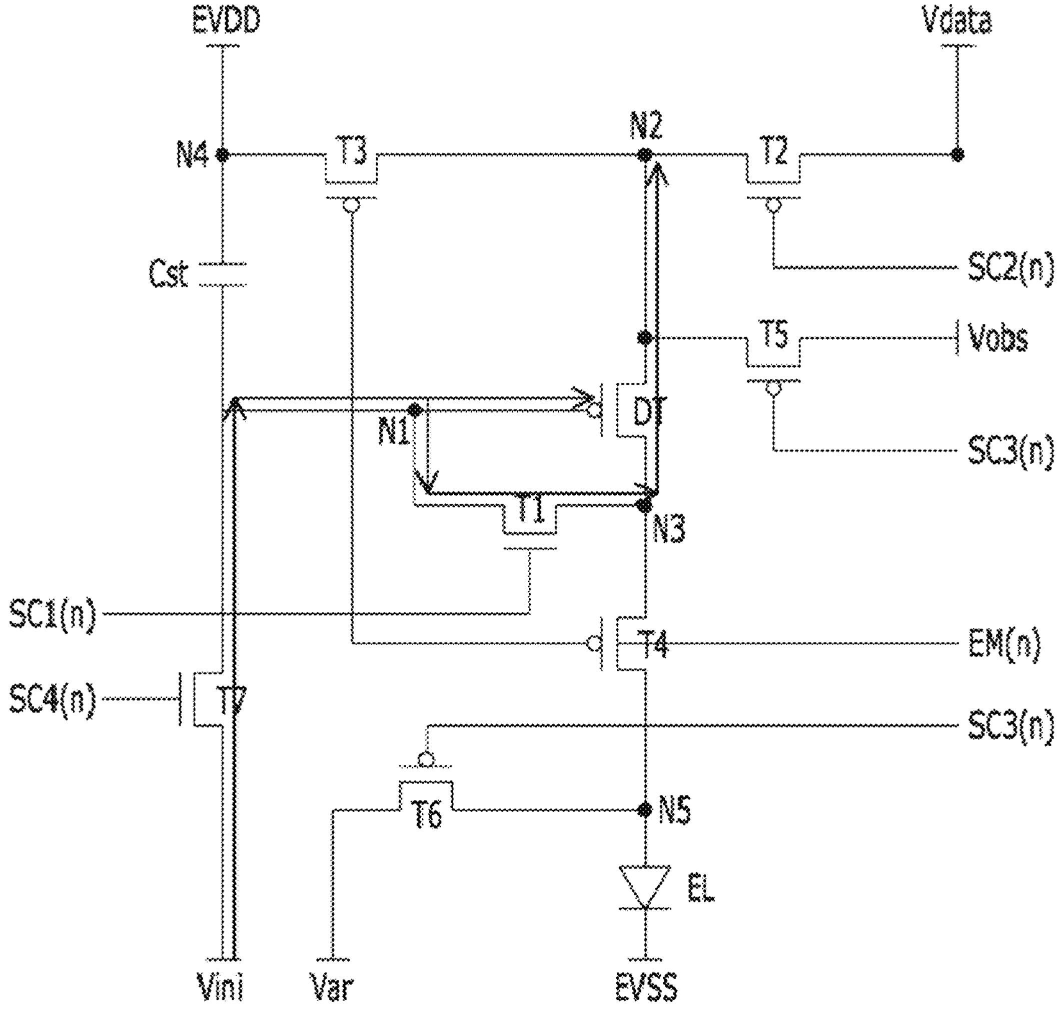

As shown in FIGS. 5 and 6B, the pixel circuit may operate in the initialization section Ti. The initialization section Ti is a section in which the voltage of the gate electrode of the driving transistor DT is initialized.

The first scan signal SC1(*n*) to the fourth scan signal SC4(*n*) and the light emission control signal EM(n) are input as high voltages. Accordingly, the first switching transistor T1 and the seventh switching transistor T7 are turned on, and the second to sixth switching transistors T2, T3, T4, T5, and T6 are turned off. As the first and seventh switching transistors T1 and T7 are turned on, the gate electrode and the second electrode of the driving transistor DT connected to the first node N1 are initialized to the second initialization voltage Vini.

Further, since the driving transistor DT is turned on by the second initialization voltage Vini, the first electrode N2 of the driving transistor DT is also initialized to the second initialization voltage Vini. That is, in the initialization section Ti, the first to third nodes N1 to N3 are initialized to the second initialization voltage Vini.

Figure 6C:
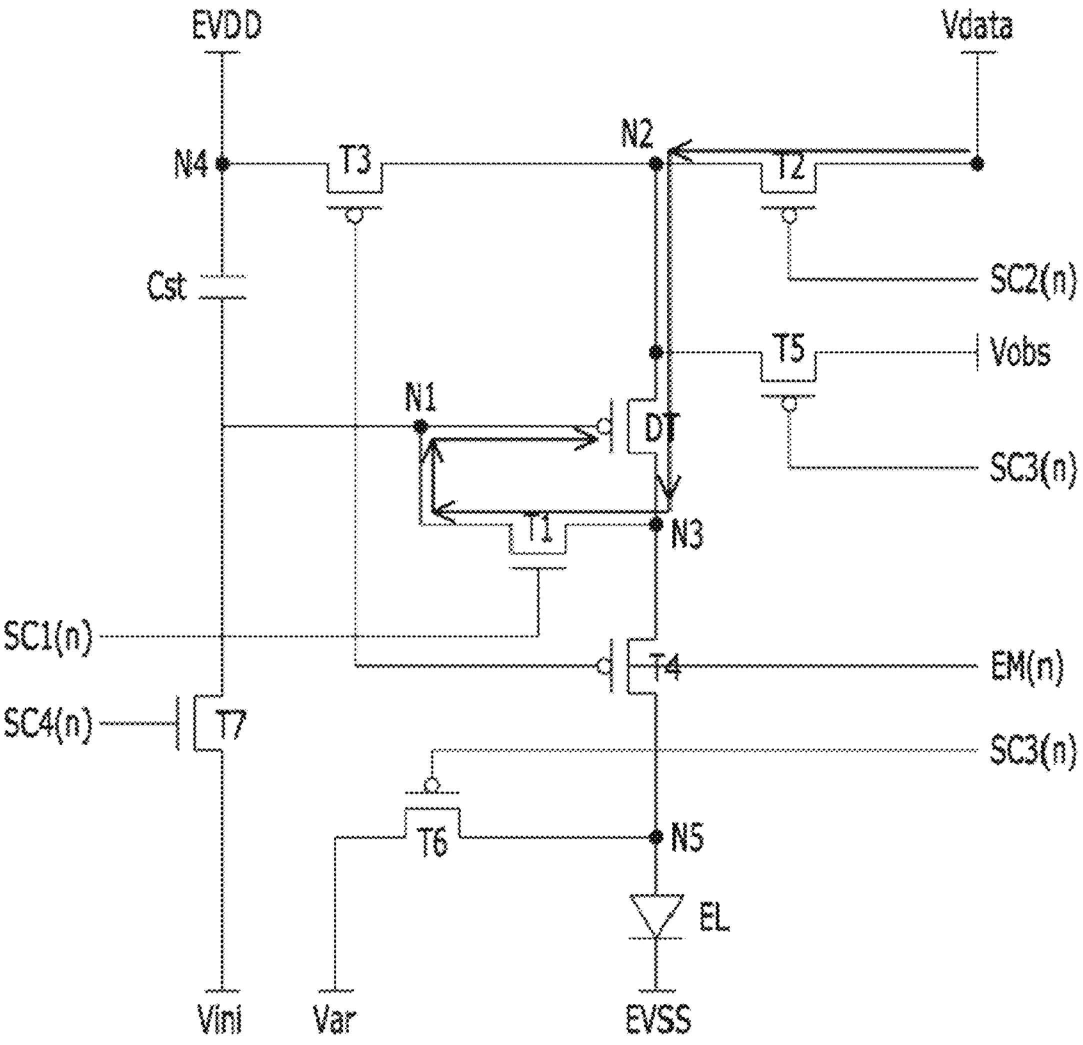

As illustrated in FIGS. 5 and 6C, the pixel circuit may operate in a programming and sampling section Ts. The programming and sampling section Ts is a section in which data is programmed and the threshold voltage Vth of the driving transistor DT is sampled.

The first scan signal SC1(*n*), the third scan signal SC3(*n*), and the light emission control signal EM(n) are input as high voltages, and the second scan signal SC2(*n*) and the fourth scan signal SC4(*n*) are input as low voltages. Accordingly, the third to seventh switching transistors T3, T4, T5, T6, and T7 are turned off, the first switching transistor T1 remains on, and the second switching transistor T2 is turned on. That is, the second switching transistor T2 is turned on, the data voltage Vatat is applied to the driving transistor DT, and the first switching transistor T1 is diode-connected between the first node N1 and the third node N3, so that the threshold voltage Vth of the driving transistor DT may be sampled.

Figure 6D:
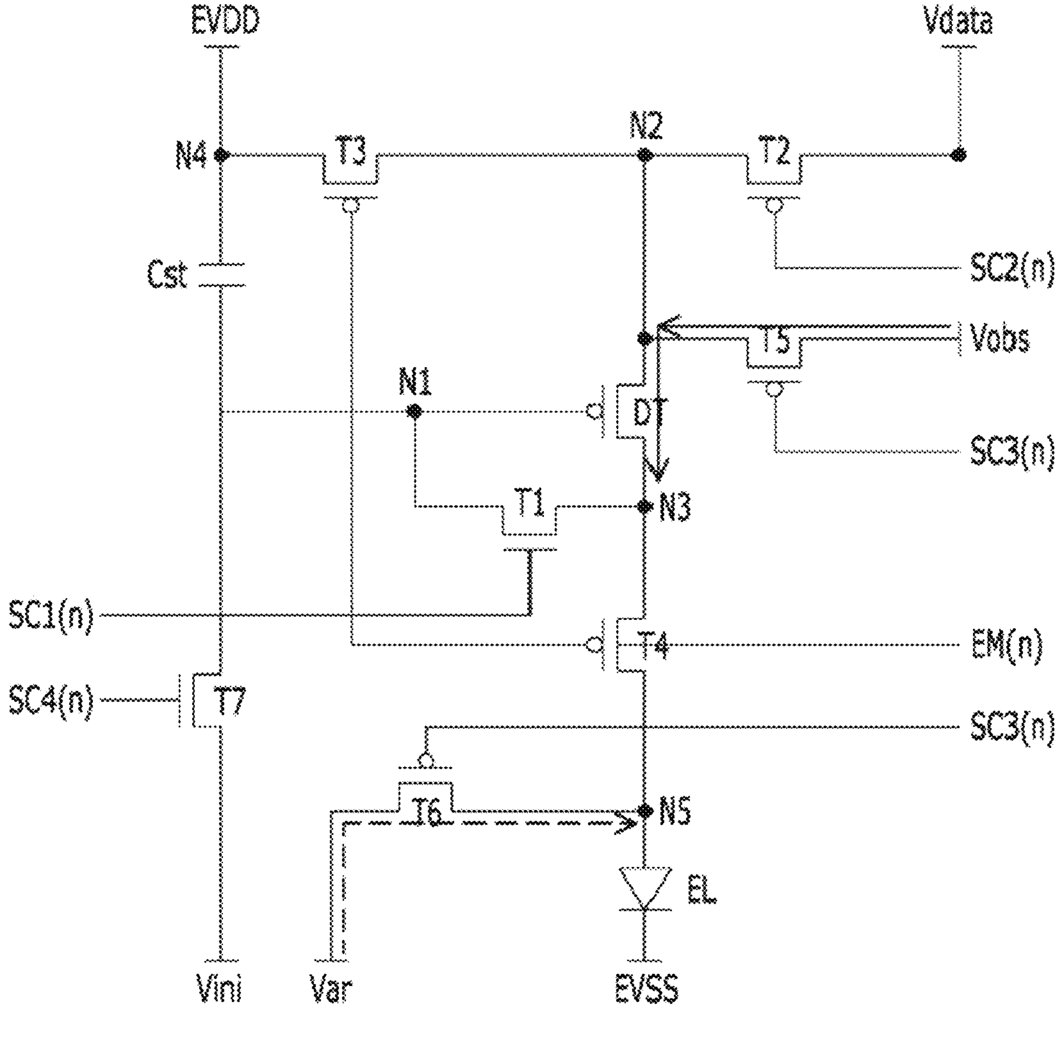

As shown in FIGS. 5 and 6D, the pixel circuit may operate in the second bias section Tobs2.

The second bias section Tobs2 is a section in which the OBS operation of applying the bias voltage Vobs is performed.

In the second bias section Tobs2, since the second scan signal SC4(*n*) and the light emission control signal EM(n) are input as high-level voltages, the second to fourth switching transistors T3 and T4 are turned off.

Since the first scan signal SC1(*n*), the third scan signal SC3(*n*), and the fourth scan signal SC4(*n*) are input as low-level voltages, the first and seventh switching transistors T1 and T7 are turned off, and the fifth and sixth switching transistors T5 and T6 are turned on. As the fifth switching transistor T5 is turned on, the bias voltage Vobs is applied to the first electrode of the driving transistor DT connected to the second node N2.

Here, when the bias voltage Vobs is supplied to the third node N3, which is the drain electrode of the driving transistor DT, a charging time or charging delay of a voltage of the fifth node N5, which is the anode of the light-emitting element EL, may be decreased in the light emission period. The driving transistor DT maintains a stronger saturation state.

For example, as the bias voltage Vobs increases, the voltage of the third node N3, which is the drain electrode of the driving transistor DT, may increase, and the gate-source voltage or drain-source voltage of the driving transistor DT may decrease. Therefore, it is desirable that the bias voltage Vobs at least be greater than the data voltage Vdata.

In this instance, the magnitude of the drain-source current passing through the driving transistor DT may be reduced, and stress of the driving transistor DT may be reduced in a positive bias stress situation, thereby solving the charging delay of the voltage of the third node N3. In other words, performing the OBS operation before sampling the threshold voltage Vth of the driving transistor DT may relax hysteresis of the driving transistor DT.

In the second bias section Tobs3, as the sixth switching transistor T6 is turned on by the third scan signal SC3(*n*), the anode (or pixel electrode) of the light-emitting element EL connected to the fifth node N5 is initialized to the first initialization voltage Var.

Figure 6E:
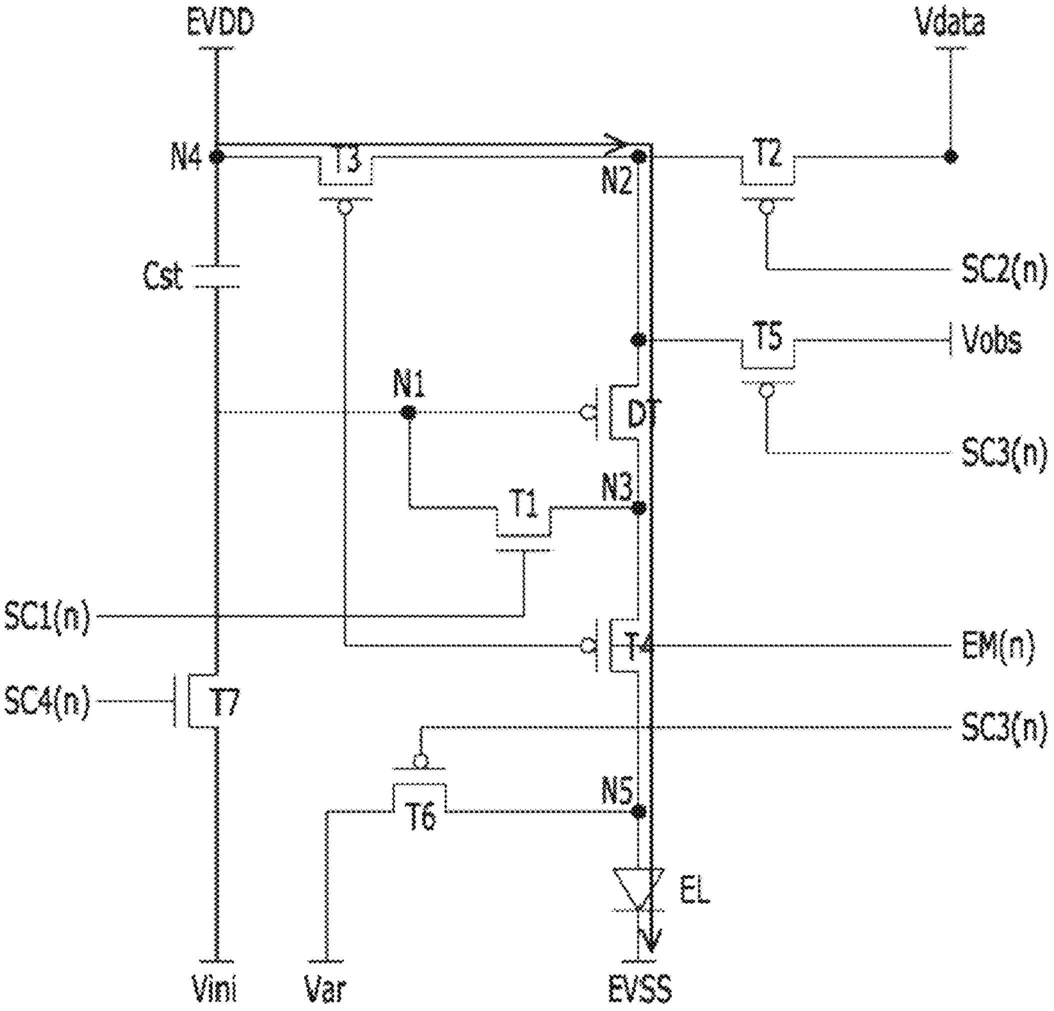

As illustrated in FIGS. 5 and 6E, the pixel circuit may operate in the light emission section Te. The light emission section Te is a section in which the sampled threshold voltage Vth is offset and the light-emitting element EL emits light with a driving current corresponding to the sampled data voltage.

Since the first scan signal SC1(*n*), the fourth scan signal SC4(*n*), and the light emission control signal EM(n) are input as low voltages, the first and seventh switching transistors T1 and T7 are turned off, and the third and fourth switching transistors T3 and T4 are turned on.

Since the second scan signal SC2(*n*) and the third scan signal SC3(*n*) are input as high-level voltages, the second, fifth, and sixth switching transistors T2, T5, and T7 are turned off.

As the third switching transistor T3 is turned on, the high-potential driving voltage EVDD connected to the fourth node N4 is applied to the first electrode of the driving transistor DT connected to the second node N2 through the third switching transistor T3. A driving current supplied from the driving transistor DT to the light-emitting element EL via the fourth switching transistor T4 is independent of a value of the threshold voltage of the driving transistor DT, and the threshold voltage of the driving transistor DT may be compensated.

FIGS. 5 and 6 describes that the first scan signal SC1(*n*) is input as a high-level voltage to the first bias section Tobs1 to prevent the operation of the NIR proximity sensor from affecting the luminance change.

However, the present disclosure is not limited thereto, and even when the first scan signal SC1(*n*) is input as a high-level voltage in a section before the programming and sampling section Ts, the operation of the NIR proximity sensor may be prevented from affecting the luminance change.

Meanwhile, in order to prevent the operation of the NIR proximity sensor from affecting the luminance change, the bias voltage Vobs may be varied to different voltages when the NIR proximity sensor operates and when the NIR proximity sensor does not operate.

An electronic device such as a smartphone or a tablet computer equipped with a display device may use synchronization signals input from the outside, such as a dot clock signal CLK, a data enable signal DE, a horizontal synchronization signal Hsync, and a vertical synchronization signal Vsync.

Such an electronic device operates the NIR proximity sensor using a synchronization signal Bsync similar to the vertical synchronization signal Vsync among the synchronization signals.

In other words, proximity of an object is detected by operating the NIR proximity sensor at regular time intervals according to a cycle of the synchronization signal Bsync. In this instance, when the synchronization signal Bsync is input, the NIR proximity sensor is operated after having a delay time of about 4.5 to 6.25 ms.

Accordingly, a time at which the NIR proximity sensor operates may be known.

In addition, as described with reference to FIGS. 3A and 3B, driving is performed by increasing a reference frame frequency, the pixel may be operated at a refresh rate, at which the data voltage Vdata is updated, higher than the reference frame frequency when high-speed driving is required, or the pixel may be operated at a refresh rate lower than the reference frame frequency when power consumption is decreased or low-speed driving is required.

In order to operate at a variable frequency in this way, driving may be performed using a combination of a refresh frame and a hold frame. In the present disclosure, one frame may be defined as a cycle in which a combination of a refresh period in which the data voltage Vdata is updated for 1 second and a hold period in which the data voltage Vdata is not updated is repeated.

Accordingly, the bias voltage Vobs may be defined corresponding to the refresh period and the hold period. The bias voltage Vobs corresponding to the refresh period may be defined as the bias voltage Vobs_A, and the bias voltage Vobs corresponding to the hold period may be defined as the bias voltage Vobs_B.

With regard to the bias voltage Vobs, in an influence evaluation evaluating an operation of the NIR proximity sensor affecting luminance change (hereinafter referred to as "NIR mura"), for NIR mura, it has been confirmed that the bias voltage Vobs_A affects both 120 Hz and 10 Hz, and the bias voltage Vobs_B affects 10 Hz.

Figure 7A:
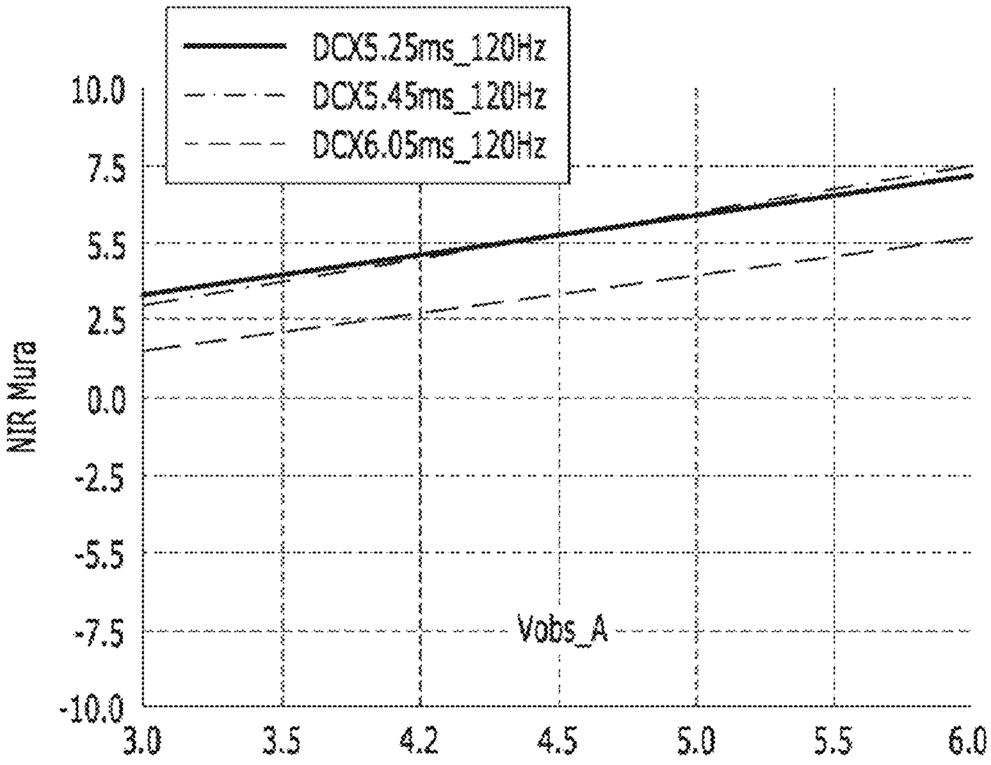
FIGS. 7A to 7C are graphs illustrating relationships of a bias voltage Vobs_A and a bias voltage Vobs_B with respect to NIR mura at operating frequencies of 120 Hz and 10 Hz.
Figure 7B:
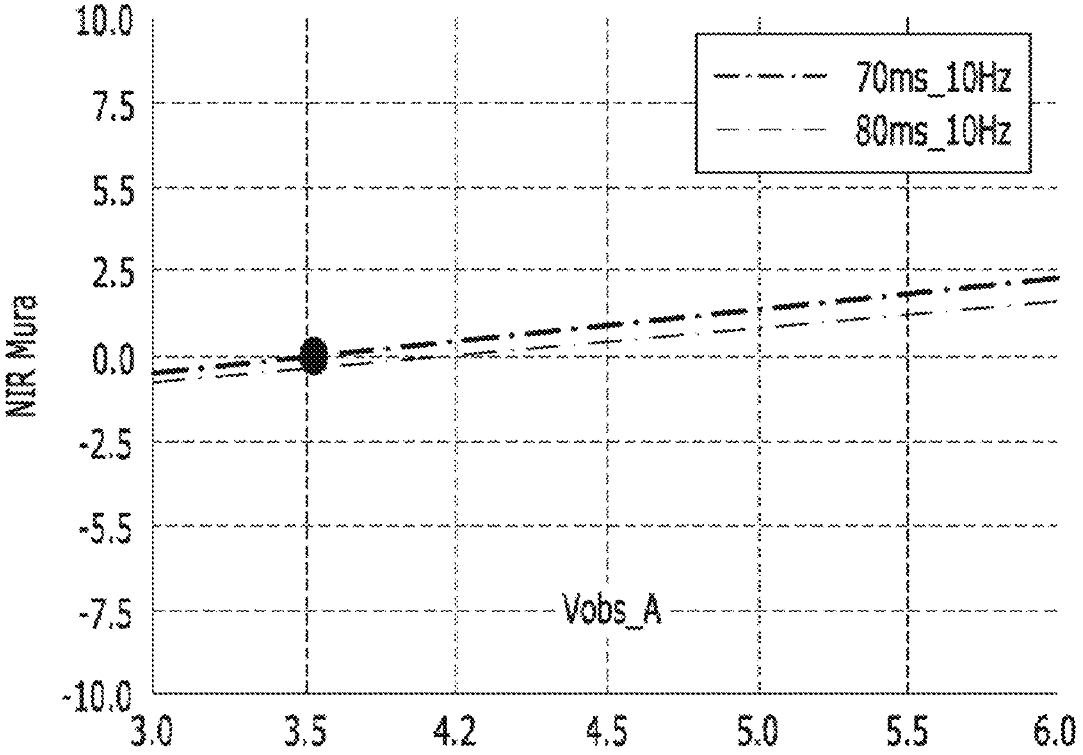
Figure 7C:
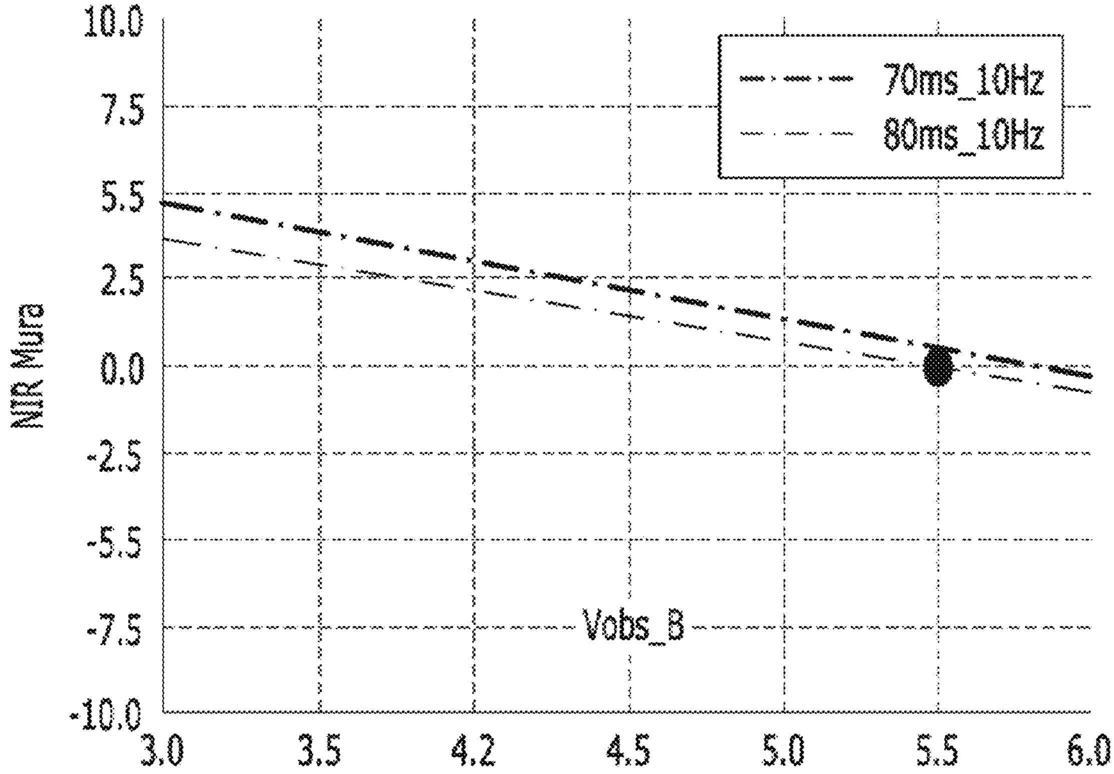

FIGS. 7A to 7C are graphs illustrating relationships of the bias voltage Vobs_A and the bias voltage Vobs_B with respect to NIR mura at operating frequencies of 120 Hz and 10 Hz according to this embodiment.

It can be seen that NIR mura is proportional to the bias voltage Vobs_A at 120 Hz as illustrated in FIG. 7A, and NIR mura is proportional to the bias voltage Vobs_A and is inversely proportional to the bias voltage Vobs_B at 10 Hz as illustrated in FIGS. 7B and 7C.

According to the results of FIGS. 7A to 7C, it can been seen that NIR mura is optimized when the bias voltage Vobs_A is 3.0 V or less at 120 Hz and 3.5 V at 10 Hz, and NIR mura is optimized when the bias voltage Vobs_B is 5.5 V.

However, since visibility of NIR mura is higher during low-frequency driving than during high-frequency driving, in this embodiment, it is possible to apply an NIR mura-optimized bias voltage Vobs_A and bias voltage Vobs_B during 10 Hz driving.

As described with reference to FIGS. 7A to 7C, the NIR mura-optimized bias voltage Vobs_A and bias voltage Vobs_B are 3.5 V and 5.5 V, which are lower than a general bias voltage Vobs_A and bias voltage Vobs_B. That is, in general, the bias voltage Vobs_A and the bias voltage Vobs_B are about 6 to 7 V.

Figure 8:
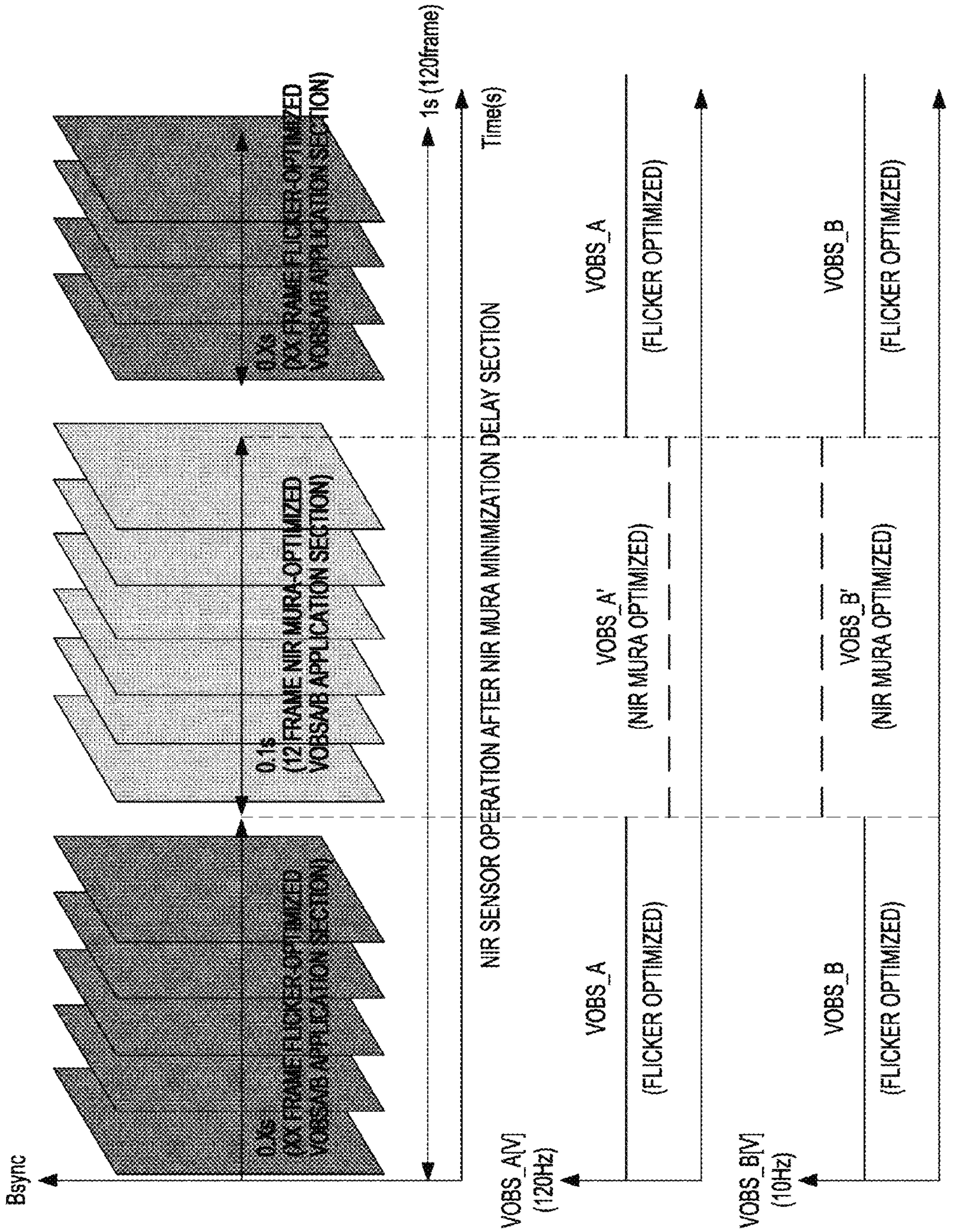
FIG. 8 is an example diagram in which NIR mura-optimized bias voltage Vobs_A and bias voltage Vobs_B are applied in units of frames according to this embodiment.

FIG. 8 is an example diagram in which the NIR mura-optimized bias voltage Vobs_A and bias voltage Vobs_B are applied in units of frames according to this embodiment.

As shown in FIG. 8, an operating time of the NIR proximity sensor is synchronized with the synchronization signal Vsync of the display device, and the NIR mura-optimized bias voltage Vobs_A and bias voltage Vobs_B may be applied in units of frames depending on whether there is a refresh frame or a hold frame only when the NIR proximity sensor operates by the synchronization signal Bsync.

As shown in FIG. 8, during a period when the NIR proximity sensor operates, the NIR mura-optimized bias voltage Vobs_A (for example, 3.5 V) is applied to the refresh frame, and the NIR mura-optimized bias voltage Vobs_B (for example, 5.5 V) is applied to the hold frame, so that NIR mura may be minimized during the period when the NIR proximity sensor operates.

In another embodiment, a method of minimizing NIR mura may be provided by integrating the NIR mura-optimized bias voltage Vobs_A and bias voltage Vobs_B.

As described with reference to FIGS. 7B and 7C, the NIR mura-optimized bias voltage Vobs_A and bias voltage Vobs_B have deviation of about 2.5 V (5.5 V-3.0 V). This deviation may weaken a function of relaxing hysteresis of the driving transistor DT by performing the OBS operation before sampling the threshold voltage Vth of the driving transistor DT, or cause flicker by generating luminance deviation in an operation period of the NIR proximity sensor between the refresh frame and the hold frame.

To prevent this, it may be conceivable to additionally output the NIR mura-optimized bias voltage Vobs_A and bias voltage Vobs_B as one bias voltage Vobs.

In other words, when an average value ((3.5 V+5.5 V)/2=4.5 V) of the NIR mura-optimized bias voltage Vobs_A and bias voltage Vobs_B is obtained, 4.5 V is supplied as the bias voltage Vobs without distinction of the refresh frame and the hold frame during time when the NIR proximity sensor operates, the operation of the NIR proximity sensor may be prevented from affecting luminance change.

Conventionally, 6 to 7 V is supplied as the bias voltage Vobs regardless of whether the NIR proximity sensor operates. Therefore, the bias voltage Vobs supplied during time when the NIR proximity sensor is in operation is lower than the bias voltage Vobs supplied during time when the NIR proximity sensor is not in operation, so that the operation of the NIR proximity sensor may be prevented from affecting luminance change.

The display device and the method of driving the same according to this embodiment have the following effects.

Since the scan signal is output so that the compensation transistor is turned on before the sampling section, the operation of the NIR proximity sensor may be prevented from affecting luminance change.

In another embodiment, since the bias voltage supplied to the bias transistor is supplied as a lower voltage during a period when the NIR proximity sensor is in operation than during a period when the NIR proximity sensor is not in operation, the operation of the NIR proximity sensor may be prevented from affecting luminance change.

The effects according to this embodiment are not limited by content illustrated above, and more diverse effects are included in the present disclosure.

Through the above-described content, those skilled in the art will be able to understand that various changes and modifications are possible without deviating from the technical idea of the present disclosure. Therefore, the technical scope of the present disclosure should not be considered limited to the content described in the detailed description of the specification and should be considered to cover at least the scope of the following claims and their equivalents.

What is claimed is:

1. A display device, comprising:

a display panel including a plurality of pixels;

a gate driver including first to fourth scan drivers and a light emission control signal driver; and an NIR (Near Infrared) proximity sensor configured to detect proximity of an object, wherein:

each of the pixels comprises:

a driving transistor configured to provide a driving current to a light-emitting element, the driving transistor including a first electrode configured to receive the data voltage and a second electrode electrically connected to the light-emitting element;

a data supply transistor configured to receive the data voltage, the data supply transistor including a first electrode configured to receive the data voltage and a second electrode connected to the first electrode of the driving transistor; and a bias transistor configured to apply a bias voltage to the driving transistor, the bias transistor including a first electrode configured to receive the bias voltage and a second electrode connected to the first electrode of the driving transistor, and the bias voltage supplied to the driving transistor by the bias transistor is supplied as different voltages during a period when the NIR proximity sensor operates and during a period when the NIR proximity sensor does not operate.

2. The display device according to claim 1, wherein the bias voltage supplied to the bias transistor is supplied as a lower voltage during the period when the NIR proximity sensor operates than during the period when the NIR proximity sensor does not operate.

3. The display device according to claim 1, wherein the bias voltage supplied to the bias transistor is supplied as a first bias voltage during a refresh frame, and the first bias voltage is supplied as a lower voltage during the period when the NIR proximity sensor operates than during the period when the NIR proximity sensor does not operate.

4. The display device according to claim 3, wherein the bias voltage supplied to the bias transistor is supplied as a second bias voltage during a hold frame, and the second bias voltage is supplied as a lower voltage during the period when the NIR proximity sensor operates than during the period when the NIR proximity sensor does not operate.

5. The display device according to claim 4, wherein the bias voltage supplied to the bias transistor is supplied as an average voltage of the first bias voltage and the second bias voltage supplied during the period when the NIR proximity sensor operates.

* * * * *